United States Patent [19]

Shockley

[11] 4,295,586
[45] Oct. 20, 1981

[54] RECEPTACLE SUPPORT APPARATUS FOR BICYCLE

[76] Inventor: Norman E. Shockley, 1119 Murfreesboro Rd., H-3, Nashville, Tenn. 37217

[21] Appl. No.: 115,013

[22] Filed: Jan. 24, 1980

[51] Int. Cl.³ .............................................. B62J 9/00
[52] U.S. Cl. ..................................... 224/32 R; 224/31
[58] Field of Search ................ 224/32 R, 32 A, 33 R, 224/39, 40, 31

[56] References Cited

U.S. PATENT DOCUMENTS

| | | | |
|---|---|---|---|
| 598,513 | 2/1898 | Henkel | 224/32 R |
| 2,539,381 | 1/1951 | Bachmann | 224/32 R |
| 3,396,885 | 8/1968 | Giondi | 224/32 R |
| 3,874,574 | 4/1975 | Heise | 224/31 |
| 4,151,939 | 5/1979 | Jorjorian et al. | 224/32 R X |

FOREIGN PATENT DOCUMENTS 861698  2/1961  United Kingdom ................. 224/32

*Primary Examiner*—Steven M. Pollard
*Attorney, Agent, or Firm*—Harrington A. Lackey

[57] ABSTRACT

An apparatus adapted to be mounted over the rear wheel of a bicycle for supporting one, and preferably a pair, of upright flexible, open-topped receptacles along each side of the rear wheel.

The apparatus includes a support frame and means for mounting the support frame upon the rear portion of the bicycle frame, at least one open-topped flexible receptacle having a rod support structure cooperatively engaging the upper margins of the end walls and outboard side wall and adapted to detachably engage cooperating sockets in the support frame.

The inboard side wall may be provided with snap fasteners for detachably securing the inboard side wall to the support frame.

The support frame may also comprise an elongated hollow housing having a hinged rear door adapted to receive the collapsed receptacles and the detachable and disassembled rods.

8 Claims, 5 Drawing Figures

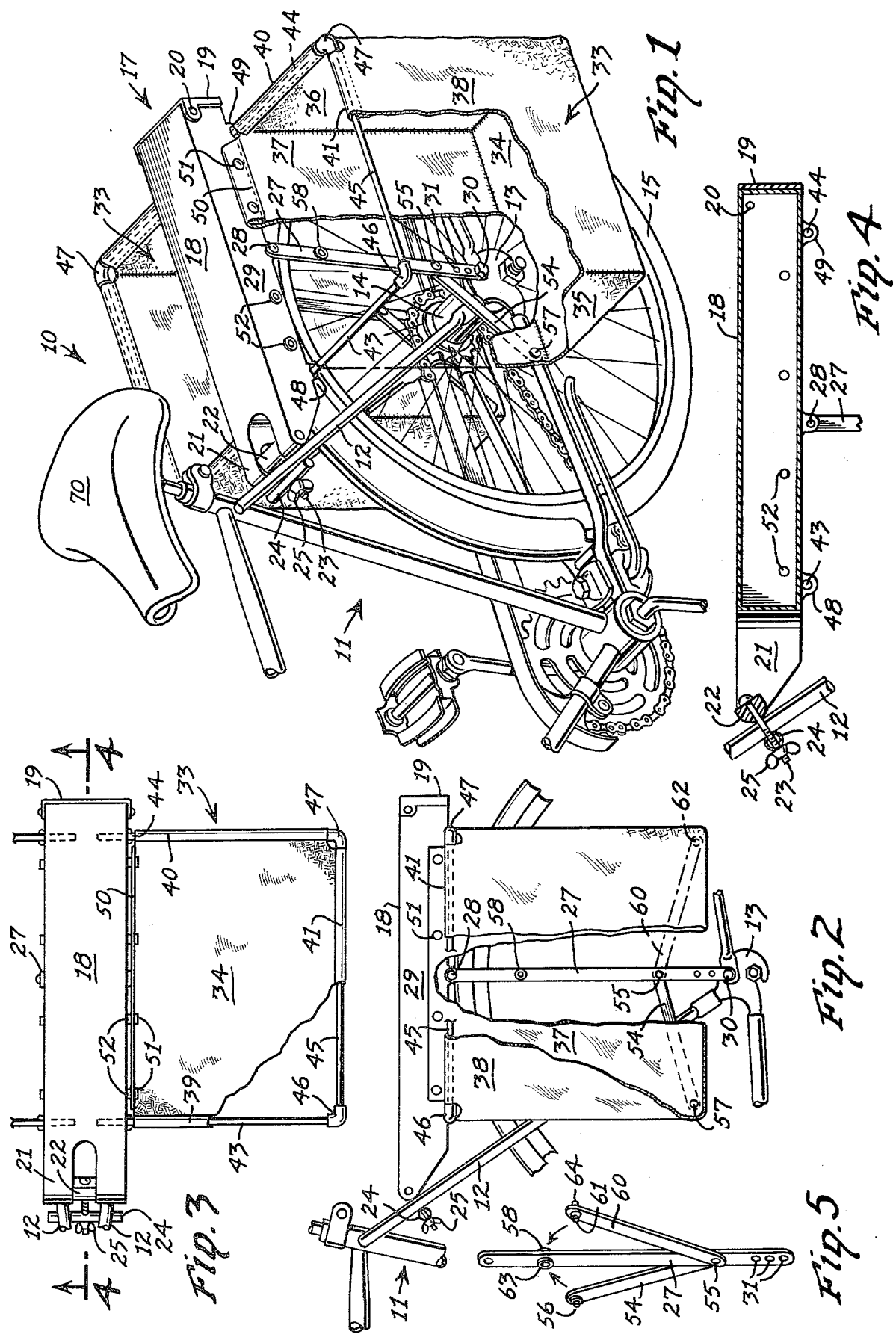

RECEPTACLE SUPPORT APPARATUS FOR BICYCLE

BACKGROUND OF THE INVENTION

This invention relates to bicycle carrier racks, and moe particularly a bicycle carrier rack for supporting flexible receptacles.

Various types of carrier racks for supporting articles on bicycles are known in the art, such as baskets mounted either on the front handle bars or over the rear wheel, and also flat book racks or luggage racks mounted behind the seat and over the rear wheel. Saddle bags are also known for straddling a horse, a motorcycle, or a bicycle behind the saddle or seat.

It is not believed that a carrier rack mountable on the frame of a bicycle over the rear wheel and specifically adapted for supporting flexible receptacles having open tops in an upright open position for carrying articles, such as grocery sacks, is known.

Furthermore, it is believed that none of the known rigid-type baskets mounted on bicycles have sufficiently large capacities for stably carrying large, standard-size grocery bags.

SUMMARY OF THE INVENTION

It is therefore an object of this invention to provide a support apparatus or a carrier rack for mounting over the rear wheel of a bicycle to support in an upright suspended position, one or two flexible receptacles.

The apparatus made in accordance with this invention includes an elongated frame or housing extending longitudinally fore and aft, above the rear wheel of the bicycle, and preferably fixed to the rear portion of the frame, such as the rear fork. The frame preferably has a clamp member at its front end for detachably engaging the rear fork of the bicycle and a pair of vertical struts straddling the rear wheel and fixed at the lower ends to the lower portion of the forks, or the wheel clips.

Projecting laterally from one or both sides of the support frame or housing is a rod structure including a pair of end rods having their inboard free ends received in cooperating sockets in the support frame and their outboard ends connected to the opposite ends of an elongated outboard rod. The end rods and outboard rod are adapted to extend through corresponding sleeves forming the upper margins of the respective end walls and outboard side wall of a receptacle made of flexible sheet material. The receptacle also includes an inboard side wall and a bottom wall. The margins define an open top in the receptacle which is held in an open position by the rod structure. The upper margin of the inboard wall is preferably provided with detachable fastener members, such as snap fasteners, for engaging mating snap fasteners secured upon the adjacent side of the support frame.

An arm pivotally mounted upon the strut is provided with another detachable snap fastener for engaging a corresponding snap fastener on a lower portion of the inboard side wall in order to stabilize the flexible receptacle in a completely open position for receiving an article, such as a grocery sack.

In the preferred form of the invention, a like receptacle and rod structure are formed on the opposite side of the support frame so that the weights of the loads, such as a pair of grocery sacks, counterbalance each other on opposite sides of the rear wheel of the bicycle.

The support frame may be a hollow housing having an open end adapted to be opened and closed by a hinged door in order to store aticles, and particularly collapsed flexible receptacles and the disassembled rods, within the housing.

BRIEF DESCRIPTION OF THE DRAWINGS

FIG. 1 is a top and side fragmentary perspective view of the rear portion of a bicycle upon which the support apparatus is mounted with portions of the rear receptacle broken away;

FIG. 2 is a fragmentary side elevation of the rear portion of the bicycle upon which the support apparatus is mounted, with portions broken away;

FIG. 3 is a fragmentary top plan view of the apparatus mounted on the rear portion of a bicycle, with portions broken away;

FIG. 4 is a fragmentary section taken along the line 4—4 of FIG. 3; and

FIG. 5 is a side perspective view of a modified strut including a pair of support arms.

DESCRIPTION OF THE PREFERRED EMBODIMENTS

Referring now to the drawings in more detail, FIGS. 1 and 2 disclose the rear portion of a bicycle 10 having a frame 11 including a rear fork 12, the lower end portions of which terminate in a pair of wheel clips 13 mounted upon the hub 14 of a rear wheel 15 straddled by the fork 12.

The support apparatus 17 made in accordance with this invention includes an elongated frame or hollow housing 18 having a rear end portion covered by a door 19 hinged to the housing 18 by the hinge pins 20. The front end portion 21 of the housing 18 defines a yoke, between the ears of which is journaled a clamp base member 22 supporting a threaded stem or bolt 23, which in turn extends through a transverse clamp bar 24 and threadedly engages a wing nut 25. Thus, by rotating the clamp bar 24 upon the stem 23 until it is in the same longitudinal vertical plane of the bicycle, the stem 23, clamp bar 24, and wing nut 25 may be inserted forward between the legs of the fork 12 until the clamp bar 24 is in front of the fork 12. The clamp bar 24 is rotated 90° about the stem 23 so that it extends transversely of the longitudinal vertical plane of the bicycle, and therefore across both legs of the fork 12. The wing nut 25 is then tightened until the clamp bar 24 securely squeezes the fork 12 between the clamp bar 24 and the yoke 21, thereby securing the frame 18 to the bicycle frame 11.

The housing or frame 18 is further supported upon the bicycle frame 11 by a pair of depending struts 27 straddling the rear wheel 15. The upper ends of the struts 27 are pivotally secured by pivot pins 28 to the side walls 29 of the housing 18. The lower end of each strut 27 is secured by a bolt 30, extending through any one of the three vertically spaced apertures 31 provided for vertical adjustment, to a corresponding hole in the wheel clip 13. The frame or housing 18 is thus rigidly supported in fixed position to the bicycle frame 11, longitudinally above the rear wheel 15.

Suspended on each side of the frame 18 are a pair of open-topped receptacles 33. Each receptacle 33 is preferably made of flexible sheet material and includes a bottom wall 34, front and rear end walls 35 and 36, an inboard side wall 37 and an outboard side wall 38.

The top margins, or marginal portions of each of the end walls 35 and 36 and the outboard side wall 38 form elongated open-ended, sleeves 39, 40, and 41, respectively, in order to receive corresponding rods 43, 44, and 45 of a supporting rod structure. Each of the sleeves 39, 40, and 41 is slightly larger than the ouer diameter of the corresponding rods 43, 44, and 45.

In the preferred form of the invention, the outboard ends of the front rod 43 and the rear rod 44 are detachably connected to the adjacent opposite ends of the outboard rod 45 by means of plastic elbows 46 and 47, each of which is adapted to slip-fit over the respective ends of the rods, and which may be readily separated from the rod in order to disassemble the rod support structure.

The inboard ends of the front end rod 43 and the rear end rod 44 are free to be slip-fitted into corresponding socket members 48 and 49 formed in the bottom portion of the housing 18. The socket members 48 and 49 have the same longitudinal spacing as the front and rear rods 43 and 44.

The upper margin 50 of the inboard side wall 37 may be folded, if desired to receive a plurality of a first set of detachable fasteners, such as snap fasteners 51. The first set of snap fasteners 51 are adapted to fastened or secured to corresponding second snap fasteners 52 fixed at the same longitudinal intervals upon the side wall of the housing 18. When all of the first snap fastners 51 engage the second snap fasteners 52, and the assembled rods 43 and 44 are inserted in their respective socket members 48 and 49, the receptacle 33 will be held in a fairly rigid open position, even though the material from which the receptacle 33 is made is flexible.

In order to further stabilize the shape of the receptacle 33, a support or brace arm 54 is pivotally mounted at one end by a pivot pin 55 to the strut 27. Thus, the support arm 54 is free to swing in a plane parallel to the strut 27 about the axis of the pivot pin 55. The opposite or remote end of the support arm 54 is provided with an outwardly directed first snap fastener 56. When the support arm 54 is swung to the downward angular position disclosed in FIGS. 1 and 2, the first fastener 56 will register with and be adapted to detachably engage a cooperating second fastener 57 on the outer surface of the inboard wall 37. When the fasteners 56 and 57 are connected, the support arm 54 will assist in stabilizing the shape of the receptacle 33 by reinforcing the inboard wall 37, and also preventing the flexible sheet material of the inboard wall 37 from moving inward into engagement with the spokes of the wheel 15. When the snap fasteners 56 and 57 are disengaged, the support arm 54 is then rotated upward to a vertical position parallel to the strut 27. The fastener 56 is then engated with a corresponding snap fastener 58 on the strut 27, to lock the support arm in an inoperative position when not in use.

In a modified construction of the strut 27, as disclosed in FIGS. 2 and 5, a second arm 60 is attached by its pivotal end to the strut 27 by the same pivot pin 55, but on the opposite side of the strut 27 from the arm 54. The upper end of the arm 60 is also provided with a snap fastener 61 which is adapted to register with and engage another snap fastener 62 on the outer surface of the inboard wall 37, on the opposite side of the strut 27 from the snap fastener 57, as best disclosed in FIG. 2. The strut 27 is also provided with another or third fastener 63 coaxial with, but on the opposite side of the strut 27 from the fastener 58. This fastener 63 is adapted to receive a fastener 64 coaxial with the fastener 61 when the support arm 60 is in its folded inoperative vertical position. As disclosed in FIG. 5, the fasteners 56, 61 and 64 are male fasteners, whereas the fasteners 58 and 63 are female fasteners. The support arm 60 is disclosed in FIG. 2 in phantom to indicate its optional use.

In using the apparatus 17, the support frame 18 is first secured to the bicycle frame 11 by securing the lower end portion of the struts 27 to the wheel clips 13 by the bolts 30. The yoke 21 is then fixed to the fork 12 by the clamp member 22-25, as previously described. If the receptacles 33 and the supporting rod structure are stored within the hollow housing 18, the door 19 is raised and the parts removed.

The flexible receptacle walls 35, 36, 37 and 38 are spread apart and the respective rods 43, 44 and 45 are inserted in their respective sleeves 39, 40, and 41. The plastic, and preferably flexible, elbows 46 and 47 are then inserted over the respective adjacent ends of the rods 43, 44, and 45, and the free inboard ends of the rods 43 and 44 are forced into their respective socket members 48 and 49. The support 54 is then disconnected from the snap fastener 58 and rotated until the snap fastener 56 (FIG. 5) is snugly fastened to the fastener 57 on the inboard side wall 37. The snap fasteners 51 on the upper margin 50 of the inboard wall 37 are then snapped to the opposing set of corresponding fasteners 52 of the side wall 29 of the hollow frame 18. This procedure is repeated for the receptacle 33 on the opposite side of the frame 18.

The receptacles 33 are then in their upright, open-top, stabilized positions as disclosed in FIGS. 1, 2, and 3, and ready to receive articles for carrying, such as sacks full of groceries or other products. The cyclist is then free to ride the bicycle 10 with the loaded receptacles 33 counter-balancing each other on opposite sides of the rear wheel 15.

Since the receptacles 33 are supported to be effectively suspended from the frame 18, the loads in the receptacles 33 present a low center of gravity. Moreover, the receptacles 33 are located behind the bicycle seat 70 so that the load carried by the bicycle 10 will not interfere with the steering or maneuvering of the bicycle.

When the receptacles 33 are no longer needed, the rods 43 and 44 may be pulled free of their corresponding socket members 48 and 49. Since the elbows 46 and 47 are flexible, in their preferred embodiment, the rods 43 and 44 are folded against the outboard rod 45, without removing the elbows 46 and 47, and without removing the rods 43, 44, and 45 from their respective sleeves 39, 40, and 41. The collapsed flexible receptacle 33 is then wrapped or rolled around the folded rods 43, 44, and 45 to form a compact package, which may be inserted through the open rear end of the hollow frame 18 for storage until future use.

What is claimed is:

1. A receptacle support apparatus for a bicycle having a rear wheel and a bicycle frame including a rear fork straddling and connected to the rear wheel, comprising:
   (a) a support frame,
   (b) means mounting said support frame on said bicycle frame over said rear wheel,
   (c) at least one receptacle made of flexible sheet material having a bottom wall, end walls, and inboard and outboard side walls, said end walls and said side walls having upper margins defining an open top, (d) rod means comprising an outboard rod portion cooperatively engaging the upper margin of said outboard side wall, and end rod portions cooperatively engaging the upper margins of said respective end walls, (e) each of said end rod portions having inboard end portions and having outboard ends connectable to said outboard rod portions, and (f) means for detachably mounting said inboard end portions to said support frame.

2. The invention according to claim 1 in which said inboard end portions comprise free inboard ends, and said detachable mounting means comprising socket means in said support frame or detachably receiving said free inboard ends.

3. The invention according to claim 1 in which the upper margins of said end walls and said outboard side walls form sleeves receiving said respective end rod portions and outboard rod portion.

4. The invention according to claim 1 further comprising at least one detachable fastener member on said support frame adjacent said inboard side wall, and a cooperative fastener member on the upper margin of said inboard side wall for detachably engaging said one fastener member.

5. The invention according to claim 1 in which a wheel clip is fixed to the rear fork and connected to the rear wheel, and in which said mounting means for said support frame comprises an elongated strut having an upper end and a lower end, said upper end being connected to said support frame and said lower end being detachably connected to the wheel clip, an arm having pivotal and free end portions, means pivotally connecting said pivotal end portion to said strut, and a first detachable fastener member fixed to the free end portion of said arm, a second detachable fastener member fixed to said inboard side wall and adapted to detachably engage said first fastener member.

6. The invention according to claim 5 further comprising a third detachable fastener member on said strut adapted to detachably engage said first fastener member when said arm is swung into an inoperative position overlying said strut and in which said first and third fastener members are in registry.

7. The invention according to claim 1 in which said support frame is elongated, and disposed longitudinally above said rear wheel and having a front end portion, said mounting means for the support frame comprising a clamp member on said front end portion adapted to be detachably clamped to said rear fork.

8. The invention according to claim 7 in which said support frame comprises an elongated hollow housing sufficiently large, and having an opening, to receive said receptacle made of flexible sheet material, when collapsed, and said outboard and end rod portions when detached from said support frame, and closure means for said opening.

* * * * *